(12) United States Patent
Stammberger et al.

(10) Patent No.: US 11,141,789 B2
(45) Date of Patent: Oct. 12, 2021

(54) POWDER MODULE

(71) Applicant: CONCEPT LASER GMBH, Lichtenfels (DE)

(72) Inventors: Jens Stammberger, Rödental (DE); Alexander Hofmann, Weismain (DE); Olaf Jäger, Lichtenfels (DE); Lukas Stache, Steinbach (DE)

(73) Assignee: Concept Laser GmbH, Lichtenfels (DE)

(*) Notice: Subject to any disclaimer, the term of this patent is extended or adjusted under 35 U.S.C. 154(b) by 177 days.

(21) Appl. No.: 16/144,565

(22) Filed: Sep. 27, 2018

(65) Prior Publication Data
US 2019/0134715 A1 May 9, 2019

(30) Foreign Application Priority Data

Nov. 3, 2017 (EP) ..................................... 17199966

(51) Int. Cl.
*B29C 64/245* (2017.01)
*B22F 7/08* (2006.01)
(Continued)

(52) U.S. Cl.
CPC ............... *B22F 7/08* (2013.01); *B22F 12/00* (2021.01); *B29C 64/153* (2017.08); *B29C 64/20* (2017.08);
(Continued)

(58) Field of Classification Search
CPC ............ B22F 2003/1058; B22F 3/105; B29C 64/153; B29C 64/245; B29C 64/20;
(Continued)

(56) References Cited

U.S. PATENT DOCUMENTS 3,684,082 A * 8/1972 Wardell ................. B65G 33/00
198/493
4,047,358 A * 9/1977 Heffernan ............... B29C 51/00
53/453
(Continued)

FOREIGN PATENT DOCUMENTS

EP 3159142 A1 4/2017
JP 2017109373 A 6/2017

OTHER PUBLICATIONS

European Search Opinion Corresponding to Application No. 17199966 dated Apr. 23, 2018.
(Continued)

*Primary Examiner* — Joseph S Del Sole
*Assistant Examiner* — Margaret B Hayes
(74) *Attorney, Agent, or Firm* — Dority & Manning, P.A.

(57) ABSTRACT

Powder module (1) for an apparatus for additively manufacturing three-dimensional objects, the powder module (1) comprising a powder chamber (6) having a power chamber volume (7) and a carrying device (9), the carrying device (9) comprising: a carrying unit (8) being moveably supported along a motion axis between a first position, particularly a lower end position, and a second position, particularly an upper end position, relative to the powder chamber (6), a drive unit (10) for generating a drive force for moving the carrying unit (8) between the first position and the second position or vice versa, a coupling unit (11) for coupling the carrying unit (8) with the drive unit (10), and a second extension state, particularly corresponding to the second position of the carrying unit (8), a guiding unit (12) surrounding the coupling unit (11).

20 Claims, 2 Drawing Sheets

Figure 1:
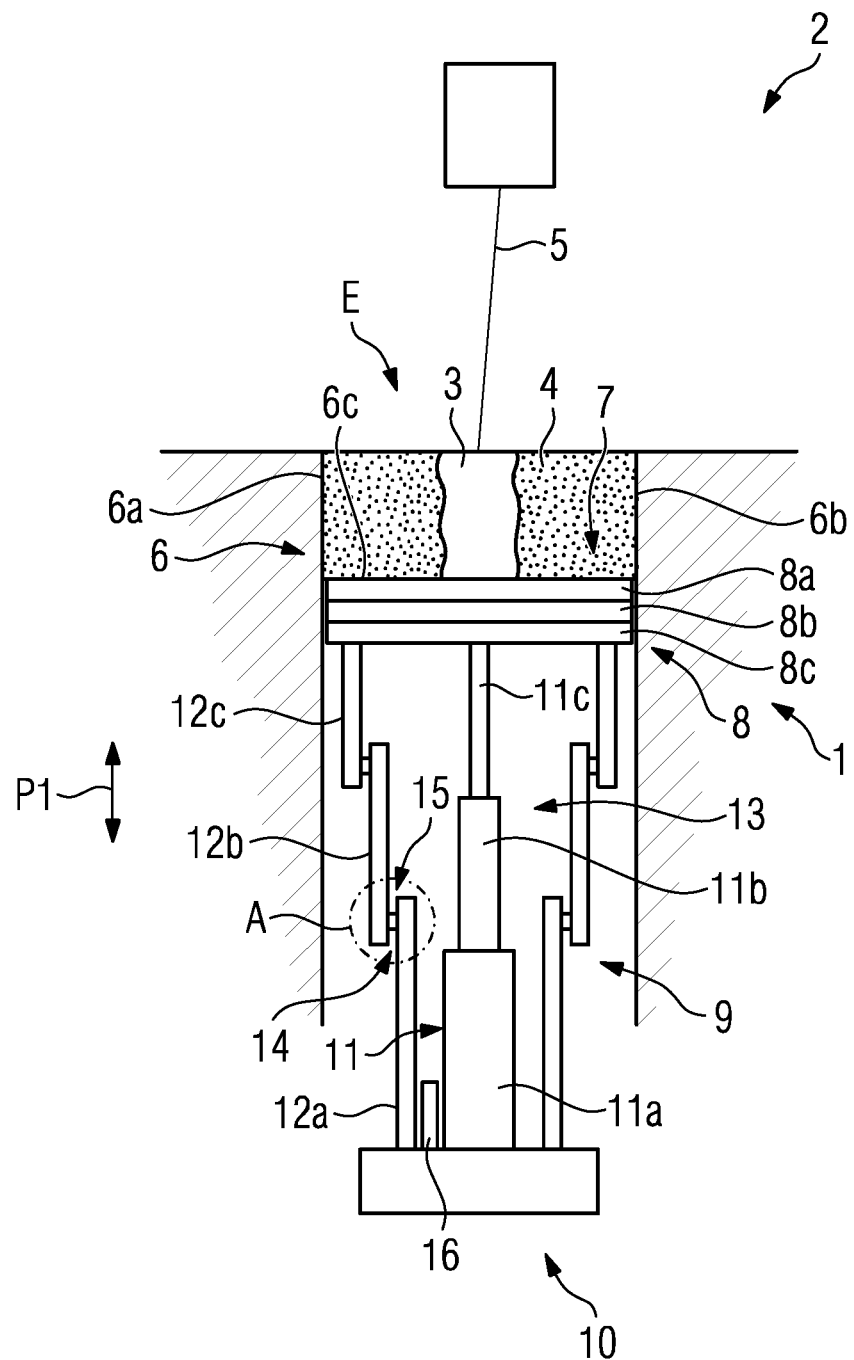

(51) Int. Cl.
*B33Y 10/00* (2015.01)
*B33Y 30/00* (2015.01)
*B29C 64/153* (2017.01)
*B29C 64/236* (2017.01)
*B22F 12/00* (2021.01)
*B29C 64/20* (2017.01)
*B29C 64/25* (2017.01)
*B22F 10/10* (2021.01)
*B33Y 70/00* (2020.01)

(52) U.S. Cl.
CPC .......... *B29C 64/236* (2017.08); *B29C 64/245* (2017.08); *B33Y 10/00* (2014.12); *B33Y 30/00* (2014.12); *B22F 10/10* (2021.01); *B29C 64/25* (2017.08); *B33Y 70/00* (2014.12)

(58) Field of Classification Search
CPC ....... B29C 64/236; B29C 64/25; B33Y 50/02; B26C 64/245; B26C 64/255
See application file for complete search history.

(56) References Cited

U.S. PATENT DOCUMENTS

| | | | | |
|---|---|---|---|---|
| 6,554,600 B1* | 4/2003 | Hofmann | ............. | B29C 64/259 425/174.4 |
| 10,639,881 B2* | 5/2020 | Herzog | ................ | B29C 64/245 |
| 2008/0042114 A1* | 2/2008 | Stanislao | .............. | B66B 9/0853 254/89 R |
| 2009/0057636 A1* | 3/2009 | Davis | ........................ | B66F 3/28 254/89 H |
| 2010/0018334 A1* | 1/2010 | Lessing | ................... | F16H 25/20 74/89.35 |
| 2012/0291701 A1* | 11/2012 | Grasegger | ............. | B29C 64/245 118/300 |
| 2015/0202687 A1 | 7/2015 | Pialot et al. | | |
| 2016/0361834 A1* | 12/2016 | Chen-Iun-Tai | ......... | B33Y 10/00 |
| 2017/0059302 A1* | 3/2017 | Mantell | .................. | B33Y 50/02 |
| 2018/0066441 A1* | 3/2018 | Chen-Iun-Tai | ...... | B28B 17/0063 |
| 2019/0143589 A1* | 5/2019 | Wang | .................... | B33Y 10/00 425/110 |
| 2019/0224749 A1* | 7/2019 | Barnhart | ................ | B33Y 30/00 |
| 2019/0262899 A1* | 8/2019 | Karlsson | ............... | B29C 64/153 |
| 2019/0351613 A1* | 11/2019 | Frutuoso | ............... | B33Y 30/00 |
| 2020/0070415 A1* | 3/2020 | Bracha | ................. | B29C 64/321 |
| 2020/0108465 A1* | 4/2020 | Sweetland | ............. | B33Y 50/02 |

OTHER PUBLICATIONS

European Search Report Corresponding to Application No. 17199966 dated Apr. 23, 2018.

Machine Translated Japanese Office Action Corresponding to Application No. 2018122772 dated Jul. 8, 2019.

\* cited by examiner

POWDER MODULE

CROSS-REFERENCE TO RELATED APPLICATIONS

This application claims priority to European Patent Application serial no. 17 199 966.7 filed Nov. 3, 2017, the contents of which is incorporated herein by reference in its entirety as if set forth verbatim.

The invention relates to a powder module for an apparatus for additively manufacturing three-dimensional objects, the powder module comprising a powder chamber having a power chamber volume and a carrying device, the carrying device comprising a carrying unit being moveably supported along a motion axis between a first position, particularly a lower end position, and a second position, particularly an upper end position, relative to the powder chamber and a drive unit for generating a drive force for moving the carrying unit between the first position and the second position or vice versa.

Respective powder modules for apparatuses for additively manufacturing three-dimensional objects are known from the field of additive manufacturing technology.

Exemplary embodiments of respective powder module are a dose module, which is filled with build material and which is adapted to successively dose a specific amount of build material which is to be applied in a build plane of a respective apparatus during operation of the apparatus, a build module, in which the actual additive build-up of three-dimensional objects takes place and which is successively filled with build material during operation of the apparatus, or an overflow module, which is adapted to successively receive build material which was not consolidated during operation of the apparatus.

Known constructions of respective powder modules occasionally encounter problems with build material which negatively affects exactly moving and positioning the carrying unit relative to the powder chamber, e.g. by entering into the drive train for moving the carrying unit. Exactly moving and positioning the carrying unit is of high importance for the additive manufacturing process.

It is the object of the present invention to provide an improved powder module for an apparatus for additively manufacturing three-dimensional objects overcoming the aforementioned drawbacks.

The object is achieved by a powder module according to independent Claim 1. The Claims depending on Claim 1 relate to possible embodiments of the powder module according to Claim 1.

The powder module described herein is a functional component for/of an apparatus (hereinafter "apparatus") for additively manufacturing three-dimensional objects, e.g. technical components, by means of successive layerwise selective irradiation and consolidation of layers of a build material—the build material may comprise at least one of a metal, a ceramic, or a polymer, for instance—which can be directly or indirectly consolidated by means of an energy beam. The energy beam may be an electron beam, a laser beam, or another optical beam, e.g. a UV beam, for instance. The apparatus can be a selective laser sintering apparatus, a selective laser melting apparatus, or a selective electron beam melting apparatus, or a metal binder jetting apparatus, for instance.

The powder module may be embodied as a dose module, which is filled with build material and which is adapted to successively dose a specific amount of build material which is to be applied in a build plane of a respective apparatus during operation of the apparatus, a build module, in which the actual additive build-up of three-dimensional objects takes place and which is successively filled with build material during operation of the apparatus, or an overflow module, which is adapted to successively receive build material which was not consolidated during operation of the apparatus.

The modular aspect of the powder module particularly may result from that the (entire) powder module may be a functional unit which may be separately handled, e.g. separately moved. As such, the powder module may be moved to a powder module related operating position of the apparatus.

The term "powder" generally refers to a build material which may be used in an additive manufacturing process. The build material does typically, yet not necessarily refer to a (fine) powder. Thus, the term "powder" is particularly not limited to a specific materiality, size (distribution), shape (distribution), etc. of build material.

The powder module comprises a powder chamber having a power chamber volume which is fillable or filled with powder (build material). The powder chamber and the powder chamber volume, respectively are typically defined by structural elements, particularly walls or wall portions, of the powder module. The bottom of the powder chamber may be defined by a carrying unit of a carrying device of the powder module, particularly by a build plate element forming a part of a typically stacked arrangement of functional elements of the carrying unit.

The powder module comprises a carrying device for carrying powder or—in the case that the powder module is a build module—at least one three-dimensional object which is additively built during operation of the apparatus the powder module is allocated to. As will be apparent from below, the carrying device comprises the required functional units of the powder module for carrying powder or a three-dimensional object which is additively built during operation of the apparatus the powder module is allocated to, respectively.

One functional unit of the carrying device is a carrying unit. The carrying unit is adapted to carry powder and/or a three-dimensional object which is additively built during operation of the apparatus the powder module is allocated to. The carrying unit may comprise a number of typically plate-like shaped functional elements in a (vertically) stacked arrangement. Respective functional elements may be a build plate element at least partly defining the build plane of the apparatus the powder module is allocated to, a tempering element, particularly a heating element, for tempering, particularly heating, the build plate element, and a carrying element for carrying the build plate element and the tempering element. As mentioned above, the carrying unit, i.e. particularly a respective build plate element, may define the bottom of the powder chamber.

The carrying unit is moveably supported along a (primary) motion axis between a first position, particularly a lower end position, and a second position, particularly an upper end position, relative to the powder chamber or within the powder chamber, respectively. The motion axis is typically a translational axis. The orientation of the motion axis is typically vertical. Yet, motions of the carrying unit may be rotational and/or translational (sub-)motions given that the resulting motion of the carrying unit is a motion along the motion axis. During operation of the apparatus the powder module is allocated to, motions of the carrying unit may be incremental, whereby each incremental motion of the carrying unit may correspond to the thickness of a build material layer which is applied in the build plane of the apparatus.

Another functional unit of the carrying device is a drive unit. The drive unit is adapted to generate a drive force for moving the carrying unit between the first position and the second position or vice versa. The drive unit may be built as or comprise at least one motor, e.g. an electric motor.

Another functional unit of the carrying device is a coupling unit. The coupling unit is adapted to structurally, particularly mechanically, couple the drive unit with the carrying unit. As such, the coupling unit is also adapted to transmit a drive force generated by the drive unit to the carrying unit. Thus, the drive unit and the coupling unit may build the drive train for moving the carrying unit.

The coupling unit is extendable between a first extension state and a second extension state. The first extension state of the coupling unit may correspond to the first position of the carrying unit, i.e. the coupling unit may be extended to the first extension state when the carrying unit is moved to the first position. Since the first position of the carrying unit may be a lower end position, the first extension state of the coupling unit may be a non-extended state in which the coupling unit is not extended. The second extension state of the coupling unit may correspond to the second position of the carrying unit, i.e. the coupling unit may be extended to the second extension state when the carrying unit is moved to the second position. Since the second position of the carrying unit may be an upper end position, the second extension state of the coupling unit may be an extended state in which the coupling unit is (fully) extended.

Another functional unit of the carrying device is a guiding unit for guiding motions of the carrying unit between. As such, the guiding unit is also adapted to stabilize the carrying unit in a desired, particularly horizontal, orientation (x-, y-orientation) relative to the powder chamber. The guiding unit therefore, is provided with the required structural, particularly mechanical, stability, i.e. particularly rigidity and/or stiffness, allowing for stabilizing the carrying unit in a desired, particularly horizontal, orientation. A desired orientation of the carrying unit typically is an exact plane arrangement of the or a build plate member of the carrying unit.

Similar to the coupling unit, the guiding unit is extendable between a first extension state and a second extension state. The first extension state of the guiding unit may correspond to the first position of the carrying unit, i.e. the guiding unit may be extended to the first extension state when the carrying unit is moved to the first position. Since the first position of the carrying unit may be a lower end position, the first extension state of the guiding unit may be a non-extended state in which the guiding unit is not extended. The second extension state of the guiding unit may correspond to the second position of the carrying unit, i.e. the guiding unit may be extended to the second extension state when the carrying unit is moved to the second position. Since the second position of the carrying unit may be an upper end position, the second extension state of the guiding unit may be an extended state in which the guiding unit is (fully) extended.

The guiding unit (entirely) surrounds the coupling unit. Since both the guiding unit and the coupling unit are extendable, surrounding the coupling unit by the guiding unit can be assured in any extension state. The guiding unit typically defines an inner volume in which the coupling unit is arranged. The guiding unit may thus, be deemed as housing of/for the coupling unit. The inner volume of the guiding unit may be or is shielded from the outside against undesired entry of build material. Hence, by arranging the coupling unit within the inner volume of the guiding unit, build material cannot negatively affect moving and positioning the carrying unit relative to the powder chamber. As a result, an improved powder module is provided.

The coupling unit may comprise a plurality of coupling segments being moveably supported relative to each other along a motion axis—which may coincide with the motion axis of the carrying unit—between a first arrangement corresponding to the first extension state of the coupling unit and a second arrangement corresponding to the second extension state of the coupling unit. Each coupling segment is provided with the required structural, particularly mechanical, stability required for the coupling function of the coupling unit; as such, each coupling segment may be built of or comprise a suitable material, e.g. a metal, or material structure of required structural, particularly mechanical, stability. A segmentation of the coupling unit into respective coupling segments—which may have a cylindrical or hollow-cylindrical shape—and a moveable support of the coupling segments allows for a reliable way of transferring the coupling unit between respective extension states. The coupling segments may be arranged in a telescopic arrangement; thus, the coupling unit may be a telescopic coupling unit which is extendable between a collapsed state (see first extension state of the coupling unit) and an extended state (see second extension state of the coupling unit). At least two coupling segments being moveably supported relative to each other may at least partly overlap in the direction of the motion axis which particularly results in structural stability of the arrangement of the coupling segments.

Similar to the coupling unit, the guiding unit may comprise a plurality of guiding segments being moveably supported relative to each other along a motion axis—which may coincide with the motion axis of the carrying unit—between a first arrangement corresponding to the first extension state of the guiding unit and a second arrangement corresponding to the second extension state of the guiding unit. Each guiding segment is provided with the required structural, particularly mechanical, stability required for the guiding function of the guiding unit; as such, each guiding segment may be built of or comprise a suitable material, e.g. a metal, or material structure of required structural, particularly mechanical, stability. A segmentation of the guiding unit into respective guiding segments—which may have a cylindrical or hollow-cylindrical shape—and a moveable support of the guiding segments allows for a reliable way of transferring the guiding unit between respective extension states. The guiding segments may be arranged in a telescopic arrangement; thus, the guiding unit may be a telescopic guiding unit which is extendable between a collapsed state (see first extension state of the coupling unit) and an extended state (see second extension state of the coupling unit). At least two guiding segments being moveably supported relative to each other may at least partly overlap in the direction of the motion axis which particularly results in structural stability of the arrangement of the guiding segments. yet, the overlap may also impede the entry of build material into the inner volume of the guiding unit.

Each guiding segment may be provided with suitable guiding elements, e.g. protrusions and/or receptacles, which co-act, e.g. engage, so as to provide a reliable guiding; as an example, a first guiding element provided with a first guiding segment may be built as or comprise a protrusion, e.g. in the shape of a guiding rail, and a second guiding element provided with a second guiding segment may be built as or comprise a receptacle, whereby the protrusion engages the receptacle. Of course, other arrangements and/or configurations of first and second guiding elements is conceivable.

The powder module may further comprise a sealing unit. The sealing unit is adapted to seal a (radial) gap between two (directly adjacently disposed) guiding segments being moveably supported relative to each other. The sealing unit typically provides a powder-proof sealing. The sealing unit comprising at least one sealing element, particularly disposed or extending between at least two guiding segments being moveably supported relative to each other.

A respective sealing element may be built as or comprise a, particularly ring-shaped, sealing lip extending between an outer wall portion of a, particularly cylindrical, first guiding segment and an inner wall portion of a, particularly cylindrical, second guiding segment. A respective sealing lip may be provided, i.e. particularly connected, with the first or second guiding segment. The sealing lip may be flexible, i.e. be built of a flexible material, e.g. an elastomer, or a flexible material structure, e.g. an elastomer structure.

A respective sealing element may also be built as or comprise a, particularly ring-shaped, sealing brush extending between an outer wall portion of a, particularly cylindrical, first guiding segment and an inner wall portion of a, particularly cylindrical, second guiding segment. A respective sealing brush may be provided, i.e. particularly connected, with the first or second guiding segment. The sealing brush may comprise a plurality of flexible bristles.

The sealing unit may comprise a plurality of sealing elements co-acting with each other so as to provide a suitable sealing. For the case that the sealing unit comprises at least two sealing elements, a first sealing element provided with a first or second guiding segment may be built as or comprise a receptacle for a receiving a protrusion of a second sealing element, and a second sealing element provided with a second or first sealing element may be built as or comprise a respective protrusion for engaging with respective a receptacle. As such, respective sealing elements may be provided with respective guiding elements mentioned above.

The powder module may further comprise at least one motion and/or position determination device, particularly a motion and/or position detection device, for determining, particularly detecting, a motion and/or a position of the carrying unit, particularly relative to a reference position of the powder module, e.g. the powder chamber, or the apparatus the powder module is allocated to. The motion and/or position determination device may be adapted to output an information about motion and/or position of the carrying unit. The information output of the motion and/or position determination device may be used for control of the drive unit. The information may be obtained from an, e.g. optical, determination (or detection) of motion and/or position of the carrying unit. The motion and/or position determination device may thus, comprise at least one, e.g. optical, determination or detection element, e.g. a sensor element, adapted to determine or detect a motion and/or a position of the carrying unit. The motion and/or position determination device is preferably also arranged inside the inner space of the guiding unit so that its operation cannot be negatively affected by build material.

The invention also relates to a carrying device for a powder module as specified above. All annotations regarding the powder module apply to the carrying device in analogous manner.

Moreover, the invention relates to an apparatus for additively manufacturing three-dimensional objects by means of successive layerwise selective irradiation and consolidation of layers of a build material which can be consolidated by means of an energy beam, the apparatus comprising at least one powder module as specified above. All annotations regarding the powder module apply to the apparatus in analogous manner.

The apparatus comprises a number of functional units each having at least one specific function during operation of the apparatus. The functional units are thus, operable or operated during operation of the apparatus. Each functional unit may comprise at least one functional sub-unit.

An exemplary functional unit may be a process chamber unit (hereinafter "process chamber"), in which the successive layerwise selective irradiation and consolidation of layers of build material takes place. The process chamber comprises wall elements or wall element portions delimiting an inner process chamber volume.

Another exemplary functional unit may be a build material application unit, e.g. a recoating unit, configured to apply layers of build material which is to be selectively irradiated and consolidated in the build plane of the apparatus. The build material application unit may comprise at least one functional sub-unit, e.g. a recoating blade, which is moveably supported relative to the build plane of the apparatus so as to apply respective build material layers.

Another exemplary functional unit may be an irradiation unit configured to selectively irradiate and thereby, consolidate portions of a layer of build material with at least one energy beam. The irradiation unit may comprise a functional sub-unit for generating an energy beam, e.g. a beam generating unit, and/or a functional sub-unit for deflecting an energy beam to different positions of the build plane, e.g. a beam deflecting unit.

The invention further relates to a method for additively manufacturing three-dimensional objects by means of successive layerwise selective irradiation and consolidation of layers of a build material which can be consolidated by means of an energy beam. An apparatus as specified above is used for implementing the method.

Figure 2:
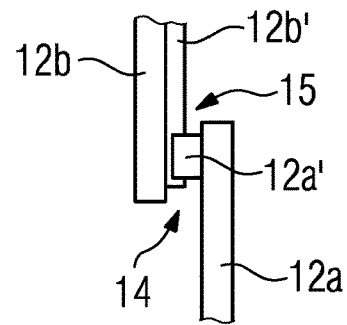
Figure 3:
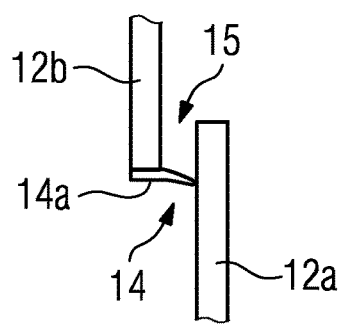
Figure 4:
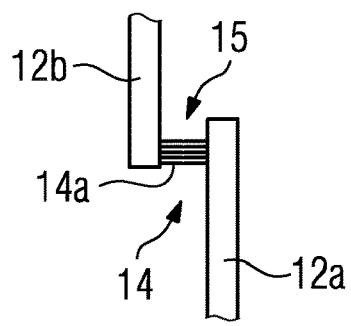

Exemplary embodiments of the invention are described with reference to the FIG., whereby:

FIG. 1 shows a principle drawing of a powder module for an apparatus for additively manufacturing three-dimensional objects according to an exemplary embodiment; and FIG. 2-4 each show an enlarged view of the detail A of FIG. 1.

FIG. 1 shows a principle drawing of a powder module 1 for an apparatus 2 for additively manufacturing three-dimensional objects 3, e.g. technical components, by means of successive layerwise selective irradiation and accompanying consolidation of layers of a powdered build material 4, e.g. a metal powder, which can be consolidated by means of at least one energy beam 5, e.g. a laser beam, according to an exemplary embodiment. The apparatus 2 can be a selective laser melting apparatus, for instance.

According to the exemplary embodiment of FIG. 1, the powder module 1 is embodied as a build module, in which the actual additive build-up of three-dimensional objects 3 takes place and which is successively filled with build material 4 during operation of the apparatus 2. Yet, the powder module 1 could also be embodied as a dose module, which is filled with build material 4 and which is adapted to successively dose a specific amount of build material 4 which is to be applied in a build plane E of the apparatus 2 during operation of the apparatus 2 or as an overflow module, which is adapted to successively receive build material 4 which was not consolidated during operation of the apparatus 2.

The modular aspect of the powder module 1 particularly may result from that the (entire) powder module 1 may be a functional unit which can be separately handled, e.g. separately moved. As such, the powder module 1 may be moved to a powder module related operating position of the apparatus 2.

As is apparent from FIG. 1, the powder module 1 comprises a powder chamber 6 having a power chamber volume 7 which is fillable or filled with build material 4. The powder chamber 6 and the powder chamber volume 7, respectively are defined by structural elements, i.e. walls 6a, 6b or wall portions, of the powder module 1. The bottom 6c of the powder chamber 6 is defined by a carrying unit 8 of a carrying device 9 of the powder module 1 which will be explained below in more detail.

The powder module 1 comprises a carrying device 9 for carrying build material 4 or—in the given exemplary case that the powder module 1 is a build module—a three-dimensional object 3 which is additively built during operation of the apparatus 2 the powder module 1 is allocated to.

One functional unit of the carrying device 9 is the carrying unit 8. The carrying unit 8 is adapted to carry build material 4 and the three-dimensional object 3 which is additively built during operation of the apparatus 2 the powder module 1 is allocated to. As is apparent from the FIG., the carrying unit 8 is arranged within the powder chamber 6. As is also apparent from the FIG., the carrying unit 8 may comprise a number of typically plate-like shaped functional elements 8a-8c in a (vertically) stacked arrangement. Respective functional elements 8a-8c are a build plate element (8a) defining the build plane E of the apparatus 2 the powder module 1 is allocated to, an optional tempering element (8b), particularly a heating element, for tempering, particularly heating, the build plate element, and a carrying element (8c) for carrying the build plate element and the tempering element. As mentioned above, the carrying unit 8, i.e. particularly the build plate element, may define the bottom 6c of the powder chamber 6.

The carrying unit 8 is moveably supported along a (primary) motion axis (indicated by double-arrow P1) between a first position, particularly a lower end position, and a second position, particularly an upper end position, relative to the powder chamber 6 or within the powder chamber, respectively. The motion axis is typically a vertically oriented translational axis. During operation of the apparatus 2 the powder module 1 is allocated to, motions of the carrying unit 8 may be incremental, whereby each incremental motion of the carrying unit 8 may correspond to the thickness of a build material layer which is applied in the build plane E of the apparatus 2.

Another functional unit of the carrying device 9 is a drive unit 10. The drive unit 10 is adapted to generate a drive force for moving the carrying unit 8 between the first position and the second position or vice versa. The drive unit 10 may be built as or comprise at least one motor, e.g. an electric motor.

Another functional unit of the carrying device 9 is a coupling unit 11. The coupling unit 11 is adapted to structurally, particularly mechanically, couple the drive unit 10 with the carrying unit 8. As such, the coupling unit 11 is also adapted to transmit a drive force generated by the drive unit 10 to the carrying unit 8. Thus, the drive unit 10 and the coupling unit 11 build the drive train for moving the carrying unit 8.

The coupling unit 11 is extendable between a first extension state and a second extension state (the coupling unit 11 is shown in an intermediate state in between the first and second extension state in FIG. 1). The first extension state of the coupling unit 11 corresponds to the first position of the carrying unit 8, i.e. the coupling unit 11 is extended to the first extension state when the carrying unit 8 is moved to the first position. Since the first position of the carrying unit 8 is a lower end position, the first extension state of the coupling unit 11 may be a non-extended state in which the coupling unit 11 is not extended. The second extension state of the coupling unit 11 corresponds to the second position of the carrying unit 8, i.e. the coupling unit 11 may be extended to the second extension state when the carrying unit 8 is moved to the second position. Since the second position of the carrying unit 8 is an upper end position, the second extension state of the coupling unit 11 may be an extended state in which the coupling unit 11 is (fully) extended.

As is shown in FIG. 1, the coupling unit 11 comprises a plurality of coupling segments 11a-11c being moveably supported relative to each other along a motion axis (which coincides with the motion axis of the carrying unit 8) between a first arrangement corresponding to the first extension state of the coupling unit 11 and a second arrangement corresponding to the second extension state of the coupling unit 11 (the coupling unit 11 is shown in an intermediate arrangement in between the first and second extension state in FIG. 1).

Each coupling segment 11a-11c is provided with the required structural, particularly mechanical, stability required for the coupling function of the coupling unit 11; as such, each coupling segment 11a-11c may be built of or comprise a suitable material, e.g. a metal, or material structure of required structural, particularly mechanical, stability. According to the embodiment of FIG. 1, the coupling segments 11a-11c are arranged in a telescopic arrangement; thus, the coupling unit 11 is a telescopic coupling unit 11 which is extendable between a collapsed state (see first extension state of the coupling unit 11) and an extended state (see second extension state of the coupling unit 11).

Another functional unit of the carrying device 9 is a guiding unit 12 for guiding motions of the carrying unit 8 between the first and second position. As such, the guiding unit 12 is also adapted to stabilize the carrying unit 8 in a desired, particularly horizontal, orientation (x-, y-orientation) relative to the powder chamber 6. The guiding unit 12 therefore, is provided with the required structural, particularly mechanical, stability, i.e. particularly rigidity and/or stiffness, allowing for stabilizing the carrying unit 8 in a desired, particularly horizontal, orientation.

Similar to the coupling unit 11, the guiding unit 12 is extendable between a first extension state and a second extension state. The first extension state of the guiding unit 12 corresponds to the first position of the carrying unit 8, i.e. the guiding unit 12 may be extended to the first extension state when the carrying unit 8 is moved to the first position. Since the first position of the carrying unit is a lower end position, the first extension state of the guiding unit may be a non-extended state in which the guiding unit 12 is not extended. The second extension state of the guiding unit 12 corresponds to the second position of the carrying unit 8, i.e. the guiding unit 12 may be extended to the second extension state when the carrying unit 8 is moved to the second position. Since the second position of the carrying unit 8 is an upper end position, the second extension state of the guiding unit 12 may be an extended state in which the guiding unit 12 is (fully) extended.

As is shown in FIG. 1, the coupling unit 12 also comprises a plurality of guiding segments 12a-12c being moveably supported relative to each other along a motion axis (which coincides with the motion axis of the carrying unit 8) between a first arrangement corresponding to the first extension state of the guiding unit 12 and a second arrangement corresponding to the second extension state of the guiding unit 12 (the guiding unit 12 is also shown in an intermediate arrangement in between the first and second extension state in FIG. 1).

Each guiding segment 12a-12c is provided with the required structural, particularly mechanical, stability required for the coupling function of the guiding unit 12; as such, each guiding segment 12a-12c may be built of or comprise a suitable material, e.g. a metal, or material structure of required structural, particularly mechanical, stability. According to the embodiment of FIG. 1, the guiding segments 12a-12c are arranged in a telescopic arrangement; thus, the guiding unit 12 is a telescopic guiding unit 12 which is extendable between a collapsed state (see first extension state of the guiding unit 12) and an extended state (see second extension state of the guiding unit 12). FIG. 1 also shows that guiding segments 12a-12c being moveably supported relative to each other may overlap in the direction of the motion axis which particularly results in structural stability of the arrangement of the guiding segments 12a-12c.

As is apparent from FIG. 1, the guiding unit 12 entirely surrounds the coupling unit 11. Since both the guiding unit 12 and the coupling unit 11 are extendable, surrounding the coupling unit 11 by the guiding unit 12 can be assured in any extension state. The guiding unit 12 defines an inner volume 13 in which the coupling unit 11 is arranged. The guiding unit 12 may thus, be deemed as housing of/for the coupling unit 11. The inner volume 13 of the guiding unit is shielded from the outside against undesired entry of build material 4. Hence, by arranging the coupling unit 11 within the inner volume 13 of the guiding unit 12, build material cannot negatively affect moving and positioning the carrying unit 8 relative to the powder chamber 6.

The powder module 1 may further comprise at least one motion and/or position determination device 16, particularly a motion and/or position detection device, for determining, particularly detecting, a motion and/or a position of the carrying unit 8, particularly relative to a reference position of the powder module 1, e.g. the powder chamber 6, or the apparatus 2 the powder module 1 is allocated to. The motion and/or position determination device 16 may be adapted to output an information about motion and/or position of the carrying unit 8. The information output of the motion and/or position determination device 16 may be used for control of the drive unit 10. The information may be obtained from an, e.g. optical, determination (or detection) of motion and/or position of the carrying unit 8. The motion and/or position determination device 16 may thus, comprise at least one, e.g. optical, determination or detection element (not shown), e.g. a sensor element, adapted to determine or detect a motion and/or a position of the carrying unit 8. As is apparent from FIG. 1, the motion and/or position determination device 16 may also be arranged inside the inner volume 13 of the guiding unit 12 so that its operation cannot be negatively affected by build material 4.

FIG. 2-4 each show an enlarged view of the detail A of FIG. 1.

As is apparent from FIG. 2, each guiding segment 12a-12c may be provided with suitable guiding elements 12a', 12b', e.g. protrusions (12b') and/or receptacles (12a'), which co-act, e.g. engage, so as to provide a reliable guiding; according to the exemplary embodiment of FIG. 2, a first guiding element provided with guiding segment 12b is built as a protrusion 12b' in the shape of a guiding rail, and a second guiding element provided with guiding segment 12a is built as a receptacle 12a', whereby the protrusion engages the receptacle. Of course, other arrangements and/or configurations of first and second guiding elements is conceivable.

FIG. 2-4 show that the powder module 1 may further comprise a sealing unit 14. The sealing unit 14 is adapted to seal a radial gap 15 between two (directly adjacently disposed) guiding segments 12a, 12b being moveably supported relative to each other. The sealing unit 1 provides a powder-proof sealing. As is apparent from FIG. 2-4, the sealing unit 14 comprises at least one sealing element 14a, 14b disposed or extending between at least two guiding segments 12a, 12b being moveably supported relative to each other.

According to the exemplary embodiment of FIG. 3, the sealing element 14a is built as a, particularly ring-shaped, sealing lip extending between an outer wall portion of guiding segment 12a and an inner wall portion of guiding segment 12b. The sealing lip may be provided, i.e. particularly connected, with guiding segment 12a or guiding segment 12b. The sealing lip may be flexible, i.e. be built of a flexible material, e.g. an elastomer, or a flexible material structure, e.g. an elastomer structure.

According to the exemplary embodiment of FIG. 4, the sealing element 14a is built as a, particularly ring-shaped, sealing brush extending between an outer wall portion of guiding segment 12a and an inner wall portion of guiding segment 12b. The sealing brush may be provided, i.e. particularly connected, with guiding segment 12a or guiding segment 12b. The sealing brush may comprise a plurality of flexible bristles.

Reverting to FIG. 2, the sealing unit 14 may also comprise a plurality of sealing elements co-acting with each other so as to provide a suitable sealing. Thereby, a first sealing element be built as or comprise a receptacle (see reference numeral 12a') for a receiving a protrusion (see reference numeral 12b'), and a second sealing element may be built as or comprise a respective protrusion (see reference numeral 12b') for engaging with respective a receptacle (see reference numeral 12a'). As such, respective sealing elements may be provided with respective guiding elements mentioned above.

The invention claimed is:

1. A powder module, comprising:
a powder chamber and a carrying device disposed within the powder chamber, the carrying device comprising:
  a build plate moveably supported along a build plate-motion axis between a first position and a second position relative to the powder chamber;
  a motor configured to generate a drive force for moving the build plate between the first position and the second position or vice versa;
  a drive train component configured to transmit a drive force to the build plate from the motor;
  a housing surrounding the drive train component, the housing configured to stabilize the build plate in a horizontal orientation relative to the powder chamber;

an inner space defined between the housing and the drive train component; and a sensor disposed within the inner space defined between the housing and the drive train component;

wherein the drive train component and the housing are respectively extendable between a non-extended state corresponding to the first position of the build plate and an extended state corresponding to the second position of the build plate; and wherein the sensor is configured to determine a motion and/or a position of the build plate.

2. The powder module of claim 1, wherein the drive train component comprises a plurality of coupling segments moveably supported relative to one another other along a drive train component motion axis between a first coupling arrangement corresponding to the non-extended state of the drive train component and a second coupling arrangement corresponding to the extended state of the drive train component.

3. The powder module of claim 2, wherein at least two of the plurality of coupling segments at least partly overlap one another in the direction of the drive train component motion axis.

4. The powder module of claim 2, wherein the plurality of coupling segments is arranged in a telescopic arrangement.

5. The powder module of claim 1, wherein the housing comprises a plurality of guiding segments moveably supported relative to one another along a housing motion axis between a first housing arrangement corresponding to the non-extended state of the housing and a second housing arrangement corresponding to the extended state of the housing.

6. The powder module of claim 5, wherein at least two of the plurality of guiding segments at least partly overlap one another in the direction of the housing motion axis.

7. The powder module of claim 5, wherein the plurality of housing segments is arranged in a telescopic arrangement.

8. The powder module of claim 5, comprising a sealing unit configured to seal gap between one or more adjacent pairs of housing segments, the sealing unit comprising at least one sealing element disposed between the one or more adjacent pairs of housing segments.

9. The powder module of claim 8, wherein respective ones of the at least one sealing element comprises a sealing lip extending between an outer wall portion of a first housing segment and an inner wall portion of a second housing segment.

10. The powder module of claim 8, wherein respective ones of the at least one sealing element comprises a sealing brush extending between an outer wall portion of a first housing segment and an inner wall portion of a second housing segment.

11. The powder module of claim 10, wherein the sealing unit comprises a plurality of sealing elements, the plurality of sealing elements comprising a first sealing element comprising a receptacle defined by a first housing segment, and a second sealing element comprising a protrusion defined by a second housing segment, the receptacle defined by the first housing segment configured to receive the protrusion defined by the second housing segment.

12. The powder module of claim 1, wherein the sensor comprises an optical sensor.

13. An apparatus for additively manufacturing three-dimensional objects, the apparatus comprising:

a powder module, the powder module comprising a powder chamber and a carrying device disposed within the powder chamber, the carrying device comprising:

a build plate moveably supported along a build plate-motion axis between a first position and a second position relative to the powder chamber;

a motor configured to generate a drive force for moving the build plate between the first position and the second position or vice versa;

a drive train component configured to transmit a drive force to the build plate from the motor;

a housing surrounding the drive train component, the housing configured to stabilize the build plate in a horizontal orientation relative to the powder chamber, the housing and the drive train component defining an inner space therebetween; and a sensor disposed within the inner space defined between the housing and the drive train component;

wherein the drive train component and the housing are respectively extendable between a non-extended state corresponding to the first position of the build plate and an extended state corresponding to the second position of the build plate; and wherein the sensor is configured to determine a motion and/or a position of the build plate.

14. The apparatus of claim 13, wherein the drive train component comprises a plurality of coupling segments moveably supported relative to one another other along a drive train component motion axis between a first coupling arrangement corresponding to the non-extended state of the drive train component and a second coupling arrangement corresponding to the extended state of the drive train component; and wherein the housing comprises a plurality of housing segments moveably supported relative to one another along a housing motion axis between a first housing arrangement corresponding to the non-extended state of the housing and a second housing arrangement corresponding to the extended state of the housing.

15. The apparatus of claim 14, wherein at least two of the plurality of coupling segments at least partly overlap one another in the direction of the drive train component motion axis.

16. The apparatus of claim 14, wherein the plurality of coupling segments is arranged in a telescopic arrangement; and wherein the housing segments are arranged in a telescopic arrangement.

17. The apparatus of claim 14, comprising a sealing unit configured to seal gap between one or more adjacent pairs of housing segments, the sealing unit comprising at least one sealing element disposed between the one or more adjacent pairs of housing segments.

18. The apparatus of claim 17, wherein respective ones of the at least one sealing element comprises:

a sealing lip extending between an outer wall portion of a first housing segment and an inner wall portion of a second housing segment; and a sealing brush extending between an outer wall portion of a first housing segment and an inner wall portion of a second housing segment.

19. The apparatus of claim 17, wherein the sealing unit comprises a plurality of sealing elements, the plurality of sealing elements comprising a first sealing element comprising a receptacle defined by a first housing segment, and a second sealing element comprising a protrusion defined by a second housing segment, the receptacle defined by the first housing segment configured to receive the protrusion defined by the second housing segment.

20. The apparatus of claim 13, wherein the sensor comprises an optical sensor.

\* \* \* \* \*